United States Patent Office 3,514,421
Patented May 26, 1970

---

3,514,421
AQUEOUS COATING COMPOSITIONS
Robert W. Kershaw, South Blackburn, Victoria, and Frederick J. Lubbock, Beaumaris, Victoria, Australia, assignors to Balm Paints Limited, Melbourne, Victoria, Australia, a company of Victoria
No Drawing. Filed Apr. 17, 1967, Ser. No. 631,140
Claims priority, application Australia, Apr. 18, 1966, 4,352/66
Int. Cl. C08f 29/46, 29/50, 47/18
U.S. Cl. 260—29.6       5 Claims

ABSTRACT OF THE DISCLOSURE

Aqueous latex paints of improved flow properties, good levelling and high gloss incorporating 0.1% to 10% of a thickener which is a poly (vinyl alcohol) derivative wherein from 1% to 50% of the hydroxyl groups are substituted in pairs by acetal groups of the formula

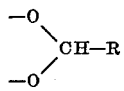

where R contains 4 to 8 carbon atoms and may be alkyl, alkenyl, aryl, alk-aryl, aralkyl or aralkene. The molecular weight of the thickener is between 30,000 and 150,000. In particular examples, R is phenyl.

---

This invention relates to coating compositions in which the important constituents are aqueous latexes and thickeners—for example latex house paints. By latex paints we mean those paints in which the resinous binder is dispersed or emulsified in an aqueous phase.

Such latex paints are usually characterized by poor flow properties in comparison with solvent borne alkyd paints, and attempts to improve these flow properties by using large particle latices have resulted in lower gloss, and attempts at improvement by using relatively large amounts of slow evaporating solvents have resulted in unacceptable drying.

One object of our invention is to provide latex coating compositions with improved flour properties, but without impairing high gloss and fast drying properties, characterised by having low yield values and high plastic viscosities which impart to the finished coating compositions excellent application properties and good levelling, when compared with conventional latex paints. By levelling we mean the process of attaining a smooth film in which the imperfections left by brush or roller application disappearing during the drying process. By yield value and plastic viscosity we mean the values calculated from the intercept on the abscissa and the slope respectively, of a graph of the shear rate/shear stress curve plotted on a square root co-ordinate graph.

The extrapolation of the graph should be made from the results in the high shear region as is accepted practice. This graph is derived from measurements made on a suitable rheometer or viscometer in which the shear stress and its corresponding shear rate may be measured at small increments or continuously over a wide range.

This graph, which is sometimes called a Casson plot, is illustrated for example, by Asbeck, in the Official Digest of the Federation of Societies for Paint Technology 33 (1961) on page 69.

We have found that levelling characteristics are conveniently described by the ratio of plastic viscosity in centipoises divided by the yield value in dyne/cms. This ratio we will call the "Flow Coefficient." We have found that, while conventional latex paints have flow coefficients below 2.0, it is possible to produce latex paints having flow coefficients above 3.0, indicating much better levelling characteristics, by adding to a latex vehicle a thickening agent selected from particular derivatives of poly (vinyl alcohol).

The plastic viscosity of our paints is not, in itself, critical, and we have found it possible to vary it from 5 centipoises to 500 centipoises. Our preferred range for application is from 50 to 300 centipoises and more preferred is the range 150 to 300 centipoises. Conventional latex paints, on the other hand, are usually limited to viscosities below 100 centipoises because of the poor levelling characteristics caused by their higher yield values.

The flow rating measured by using the New York Paint Club level test blade, is similarly a measure of flow properties. The method is described by Stieg in the Official Digest of the Federation of Societies for Paint Technology 32 1435–1445.

This blade is a film applicator, bearing five pairs of notches of varying clearance, with which a latex paint film is cast on glass and the degree to which the pairs of film flow and merge together is a measure of levelling. Conventional latex paints receive rating of less than one, whereas latex paints provided by this invention receive rating greater than two and preferably greater than four. It is possible to formulate latex coating compositions with these improved flow properties with respect to levelling, when compared to those in present commercial use, by employing as the thickening agent particular derivatives of poly (vinyl alcohol), as described below.

The present invention accordingly provides a composition comprising the following two essential components:

(1) A latex vehicle.—This is understood to include the aqueous latex, as prepared, together with any added water, solvents and surfactants used in the preparation of the paint. The latex vehicle of our invention may have 5% to 60%, preferably 5–50% by weight calculated on the latex vehicle of dispersed resinous particles which shall have an average particle size between 0.01 micron and 3.0 microns preferably between 0.1 micron and 1.0 micron. The continuous phase may contain up to 30% by weight of added water miscible solvents and up to 4% added surface active agents, based on the weight of the continuous phase.

(2) Between 0.1% and 10.0% by weight, preferably between 0.5% and 5.0% by weight, based on the weight of resinous particles, of a thickening agent or agents selected from at least one of the poly (vinyl alcohol) derivatives below, which are suitable for the particular continuous phase chosen.

(1) Latex vehicle.—The composition of the resinous particles is not critical and we have found our invention is applicable to the major classes of polymer and copolymer latex dispersions.

We have found that the "acrylic" copolymer emulsions are particularly suited for use with our thickeners to produce good flowing paints. By "acrylic" we mean copolymers substantially composed of the esters of acrylic and methacrylic acids, in which the ester group contains from 1 to 10 carbon atoms.

Our thickeners can be used to produce good flowing paints with those latex dispersions which are substantially composed of copolymers of styrene. The customary comonomers used with styrene are the acrylate or methacrylate esters, or olefines in particular butadiene.

The suitability of a particular latex dispersion for use in our invention is dependent upon the dispersant and the protective colloids use din the preparation of the latex dispersion. Some dispersants and many protective colloids are deleterious to our invention and their use must be avoided as taught later in this specification.

It is known in the art that minor (less than 3% by weight of the resin) proportions of other monomers are sometimes used to further modify the above copolymers and we include such modifications in our definition of suitable copolymers.

The continuous phase comprises water as the suspending medium, into which may be introduced solvents either with the latex itself or separately into the paint. These solvents adjust viscosity, control evaporative properties and provide freeze-thaw stability, according to the purpose to which the composition is to be applied. Furthermore, the continuous phase includes surface active agents which are used to stabilise the polymer and pigment particles.

By solvents we mean all water soluble or water miscible organic liquids which are conventionally used in latex paints to control evaporation properties. Up to 30% by weight may be present in the continuous phase.

The preferred types of solvents are alkyl alcohols, alkylene glycols, alkyl glycol ether alcohols, alky ketones and some alkyl ethers. We have found ethyl alcohol, propyl alcohol, ethylene glycol, propylene glycol, butylene glycol, hexylene glycol, diethylene glycol, 2-methoxy ethanol, 2-ethoxy ethanol, 2-propoxy ethanol, 2-butoxy ethanol, diethylene glycol mono-methyl ether, diethylene glycol mono-ethyl ether, diethylene glycol mono-propyl ether, diacetone alcohol, and dioxan to be satisfactory solvents.

The more preferred solvents are:

ethylene glycol 2-ethoxy ethanol
propylene glycol 2-butoxy ethanol and
butylene glycol diacetone alcohol The type and concentration of solvent used affects the composition at which a given thickener is soluble in the continuous phase as is discussed in more detail below.

The formulation of latex paints requires that surface active agents are necessary in the preparation of the latex, in the dispersion of the pigment, and to assist the paint to "wet" greasy surfaces. The selection of these is such that they must be compatible with the thickener in that they show no throwout or give an unsatisfactory flow coefficient as described earlier.

The total concentration should not exceed 4% of the continuous phase. They are important in that, like the above-mentioned solvents, they extend the solubility range of thickeners.

(2) The thickening agent in the present invention is a poly (vinyl alcohol) derivative. The molecular weight is not narrowly critical but a suitable range is between approximately 10,000 and 600,000, and our preferred range is between approximately 30,000 and 600,000, and our more preferred range is between 30,000 and 150,000. Where exceptional ease of brushing is required and a degree of poorer water resistance is permissible, we have found that the thickeners of our invention can be as low as 10,000 in molecular weight. At molecular weights greater than 150,000 brushing becomes difficult.

From one percent to fifty percent preferably from five percent to fifty percent, of the hydroxyl groups present in the poly (vinyl alcohol) molecule are substituted by the acetal groups defined below. The acetal groups of our invention are represented by:

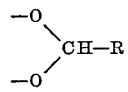

each of these groups replacing a pair of adjacent hydroxyl groups, and where R may have up to 8 carbon atoms, preferably 4 carbon atoms to 8 carbon atoms, and may be alkyl, alkenyl, aryl, alk-aryl, ar-alkyl, or ar-alkene, these groups may be the same or mixed within the polymer molecule. For example R may be ethyl, propyl, iso-propyl, n-butyl, iso-butyl, secondary butyl, tertiary butyl, n-hexyl, phenyl (derived from benzaldehyde), and ethylenephenyl (derived from cinnamaldehyde).

The most preferred representative is when R is phenyl, i.e., our preferred thickener is a partial benzal of polyvinyl alcohol.

The thickening agent is chosen from within the quoted compositions so that it remains soluble in the continuous phase. By soluble we mean that a homogeneous solution results; that is, micellar solutions are included, even hazy solutions in which the micelles are large enough to interact with light are considered in this invention to be homogeneous.

The desired level of substitution of hydroxyl groups by acetal groups is dependent upon the amount of organic solvent, if any, surface active agents present in the continuous phase. It will be understood by those skilled in the art, that the presence of solvents and surface active agents will permit thickeners having higher levels of substitution by acetal groups to remain in solution, than would remain in solution in water alone.

We have also found that the desired level of substitution of hydroxyl groups is also dependent upon the pH of the final paint and upon the molecular weight of the thickener molecules. We have found that by suitable choice of these parameters the level of substitution can be extended to the lower part of the range in Table I, for example, with pH below 8.5 or with molecular weights less than 50,000 we can extend the range of substitution to the lower part of the range.

The upper limit of thickener concentration for each chosen system of solvent, water and thickener is thus easily determined by experiment by merely checking the solubility of the thickener in the continuous phase.

The lower limit is defined by unsatisfactory flow properties in the final latex paint, that is, when the flow coefficient falls below our preferred range as stated earlier.

The desired level of substitution of poly (vinyl alcohol) depends upon the chain length of the substituent. For the preferred derivatives the degree of substitution expressed as a percentage of the total hydroxyl groups is:

PERCENTAGE OF TOTAL HYDROXY GROUPS REPLACED

| Average carbon atoms in R | Widest range | Preferred range | Most preferred range |
|---|---|---|---|
| 2 | 10-25 | 15-25 | 15-22 |
| 3 | 5.5-20 | 10-20 | 10-17 |
| 4 | 3.5-17 |  | 10-17 |
| 5 | 2.5-15 | 5-15 | 5-10 |
| 6 | 2-15 | 5-15 | 5-10 |
| 7 | 1.5-10 |  | 5-10 |
| 8 | 1-10 |  | 5-10 |

Our acetal thickeners may be prepared by the well known methods of direct reaction of poly (vinyl alcohol) with the required aldehyde in acid solution. We have found it advantageous that an excess of aldehyde should be used and the excess removed during the processing.

We have found it possible to use as starting material a partially hydrolysed poly (vinyl ester), and after reaction with aldehyde, to remove the ester groups to yield a thickener of our invention.

We have also found it possible to use as starting material poly (vinyl acetal), and by removing aldehyde to the desired degree, to produce a thickener of our invention.

The thickening agent can be used at a concentration of 0.1 to 10% by weight of the latex polymer solids, but preferably at 0.5 to 5.0% by weight.

A latex paint contains a variety of ingredients other than the latex and thickener, each of which contributes desired properties to the paint.

Most latex paint recipes include the majority of the following additional types of ingredients, the examples named being ingredients which we have found to be satisfactory in the invention.

| Ingredient | Purpose | For example |
| --- | --- | --- |
| Pigment | Opacity, colour, durability. | Titanium dioxide, phthalocyanine blue. |
| Fillers or extenders | Lower cost, lower gloss, control of application, film stabiliser. | Whiting, talc, barytes, china clay. |
| Dispersant | Pigment wetting and dispersion. | Sodium hexametaphosphate. Alkali metal polyphosphates or silicates. |
| Plasticiser | To flexibilise the film former. | Di-butyl phthalate tri-butyl phosphate. |
| Defoamer | Foam prevention in manufacture and application. | A fatty acid/ethylene oxide condensate. |
| Preservatives | To prevent mould growth in the paint and on the paint film. | Penta-chlor phenol organo-mercurials. |
| Perfume | Deodorant | |

The selection of these remaining ingredients is limited by the requirement that all of the ingredients must be mutually compatible. For example certain pigments such as lead chromate are not used in latex paints because of high water soluble material content, and unconventional materials like this should be avoided. Other materials which are known to react with poly (vinyl alcohol), or which are likely to adversely interact with the latex/thickener combination, such as boric acid and borate ions, should not be used. Both of these undesirable variations result in obvious incompatibility and gelation of the paint.

Less obvious, but still deleterious to our invention, is a decrease in flow coefficient of the latex paint caused by unsuitable choice of additives of which cellulose derivatives and lecithins are examples, because of the lack of mutual compatibility.

The test of this mutual compatibility is the measurement of flow coefficient of the latex paint, as described earlier. If a latex paint is thickened according to this invention, and yet the flow coefficient when measured is below our preferred limits then it is likely that this is due to the presence of an ingredient which interacts with the latex/thickener combination, and is deemed to be an incompatible ingredient according to the invention.

It is understood that for some special purposes materials of inferior flow characteristics may be desirable and that our invention covers the above latex paints containing the poly (vinyl alcohol) derivatives described in this invention, in which the ingredients show a degree of mutual incompatibility, as defined above, giving the required flow characteristics.

The complete latex paint is conveniently prepared by dispersing or grinding the pigments and fillers with the dispersant, thickener, defoamer and water in a ball mill, or sand mill, or colloid mill, or sigma bladed mixer, or impeller mixer, and when satisfactorily dispersed this mill base should be added and stirred into the latex and other ingredients which have been previously mixed together.

The following examples are illustrative of the invention. Parts indicated are by weight unless otherwise noted. As is well known in the art, the gloss of latex paint films is somewhat dependent upon the method of mixing the mill base with the complete paint, the other components and the degree of filtration of the complete paint. Viscosities were measured at 25° C.

EXAMPLE 1

This example illustrates the preparation of a thickener by the method of the invention. A partial butyral of poly (vinyl alcohol) was prepared by the partial hydrolysis of poly (vinyl butyral). The degree of hydrolysis, which was sufficient to produce a water soluble polymer, was controlled by the quantitative addition of hydroxylamine hydrochloride.

Ten parts of "Butvar B98" (a registered trademark of Shawinigan Resins Corporation), a poly (vinyl butyral) resin, was dissolved in 75 parts of dioxane, and then 0.75 part of 35% w./v. hydrochloric acid was added. To this solution 20 parts of water and 2.7 parts of hydroxylamine hydrochloride were added, and the mixture was refluxed for two hours. The mixture was allowed to cool and then poured into 200 parts of acetone. A light brown mass was thus produced, which, after removal of excess solvent by squeezing, was dissolved in 60 parts of distilled water to give a viscous solution containing 22.5% solids. The solution thus obtained will be referred to as thickener A.

EXAMPLE 2

A partial butyral of poly (vinyl alcohol) was prepared from a random copolymer of vinyl alcohol and vinyl acetate, containing about 20% by weight of vinyl acetate units, by reaction with butyraldehyde and with simultaneous hydrolysis of the acetate groups.

Ten parts of "Gelvatol 20–90" (a registered trademark of Shawinigan Resins Corporation), a poly (vinyl alcohol) resin containing about 20% residual poly (vinyl acetate), was dissolved in a mixture of 100 parts of dioxane and 80 parts of distilled water. To this solution was added 1.145 parts of butyraldehyde and 1.20 parts of 35% w./v. hydrochloric acid. The mixture was refluxed for twenty hours, and was then neutralised with 30% w./v. ammonia solution. The polymer was precipitated by pouring the solution into 400 parts of acetone. After pouring off the excess liquid, the light brown mass obtained was dissolved in distilled water to give a viscous solution containing 7.1% solids. This solution will be referred to as thickener B.

The infrared spectra of a film formed from the solution by evaporation showed that reaction with butyraldehyde had occurred, and that most of the acetate groups originally present in the polymer had been removed.

EXAMPLE 3

A partial propional of poly (vinyl alcohol) was prepared by the method given in Example 2, except that the butyraldehyde was replaced by 1.98 parts of propionaldehyde. A viscous solution was obtained, containing 9.2% solids, and this will be referred to as thickener C.

EXAMPLE 4

A partial propional of poly (vinyl alcohol) was prepared by reacting poly (vinyl alcohol) with excess propionaldehyde, and removing this excess by means of a distillation process.

Ten parts of "Gelvatol 1–90" (a registered trademark of Shawinigan Resin Corporation), a poly (vinyl alcohol) resin, was dissolved in 100 parts of distilled water. To this solution 80 parts of iso-propanol, 3.31 parts of propionaldehyde, and 1.20 parts of 35% w./v. hydrochloric acid were added. The mixture was refluxed for two hours after which 60 parts were distilled from the bulk of the mixture over a period of four hours. The remaining portion of the solution was neutralised with normal sodium hydroxide solution. The neutral solution containing 6.9% solids will be referred to as thickener D.

The infrared spectra of the polymer at various stages during the distillation stage showed that approximately half of the propionaldehyde originally present had been removed.

EXAMPLE 5

A partial propional of poly (vinyl alcohol) was prepared from a random copolymer of vinyl alcohol and vinyl acetate, containing about 20% of vinyl acetate units, by reaction with excess propionaldehyde, followed by alkaline hydrolysis of the acetate groups and removal of excess propionaldehyde by distillation.

Ten parts of "Gelvatol 20–90" were dissolved in a mixture of 100 parts of dioxane and 80 parts of water. To this solution was added 2.41 parts of propionaldehyde and 1.20 parts of 35% w./v. hydrochloric acid. After refluxing this mixture for two hours, 14 parts of a 20% w./v. solution of sodium hydroxide was added.

The mixture was then refluxed for a further two hours during which time nearly all of the acetate groups present in the polymer were hydrolysed.

Sufficient 35% w./v. hydrochloric acid to bring the pH of the solution back to between 1 and 2 was added, and 21 parts of the mixture was distilled out. Infrared spectra showed that about one quarter of the initial amount of aldehyde was removed by this distillation process. The remaining portion of the solution was poured into 500 parts of acetone, and a light brown mass was formed. After removal of excess liquid, the mass was dissolved in a mixture of distilled water and 2-ethoxy ethanol in the weight ratio of 10:1 to give a solution containing 8.1% solids.

This solution will be referred to as thickener E.

EXAMPLES 6–11

These examples illustrate the preparation of aqueous latex paints by the method of the invention. The latex Finally each paint was strained through silk to remove the sand.

Films of each of the paints made as Examples 6–11 were prepared on glass panels using a doctor blade of clearance 0.005".

The gloss values measured at an angle of 60° according to A.S.T.M. Specification D523 are given in Table 1. All of these gloss values indicate excellent gloss for latex paints.

The rheology of each of the paints in Examples 6–11 was measured at 25° C. on an Epprecht Rheomat "15." The plastic viscosities and flow coefficients as defined in our invention were determined and are recorded in Table 1. In each case the plastic viscosity lies in the range 1.5–3.0 poises, and the flow coefficients are above 4.5, indicating that the paints have excellent flow characteristics. This is confirmed by the New York Paint Club Flow Ratings also recorded in Table 1, which are all above 2.

These results show that the paints given as Examples 6–11 will form films of exceptional gloss and with remarkable freedom from brush marks.

TABLE 1

| | Example No. | | | | | |
| --- | --- | --- | --- | --- | --- | --- |
| | 6 | 7 | 8 | 9 | 10 | 11 |
| | Thickener solution used (from Examples 1–5) | | | | | |
| | A | B | C | D | E | B |
| | Latex used | | | | | |
| | Primal AC61, plasticised* | Primal AC61, plasticised* | Primal AC61, plasticised* | Primal AC61, plasticised* | Primal AC61, plasticised* | MV1 |
| Composition: | | | | | | |
| Austiox R-CR3 | 10 | 10 | 10 | 10 | 10 | 10 |
| Nopco NXZ | 0.1 | 0.1 | 0.1 | 0.1 | 0.1 | 0.1 |
| 25% sodium hexameta-phosphate solution | 0.3 | 0.3 | 0.3 | 0.3 | 0.3 | 0.3 |
| Distilled water | 6 | 3 | 2.5 | 3.5 | 3.7 | 1.0 |
| Thickener solution | 3 | 4 | 4.5 | 3.5 | 2.3 | 5.0 |
| Latex | 27 | 27 | 27 | 27 | 27 | 27 |
| Fedwet 302 | 0.1 | 0.1 | | | | |
| Properties: | | | | | | |
| Gloss at 60° | 75 | 75 | 75 | 78 | 75 | 65 |
| Plastic viscosity (centipoise 25°C) | 160 | 230 | 326 | 193 | 240 | 120 |
| Flow coefficeint | 6.4 | 4.7 | 9.0 | 4.5 | 4.9 | 3.5 |
| N.Y.P.C. flow rating | 5 | 3 | 4 | 4 | 3 | 6 |

*Primal AC61, 97.5 parts; tributylphosphate, 2.5 parts.

paints incorporate thickener solutions A–E from Examples 1–5 and when prepared they all exhibited exceptional flow characteristics and gloss on application.

The composition of each of the latex paints in these examples is summarised in Table 1. In each case the paint was prepared by first mixing a mill base consisting of 10 parts of "Austiox R–CR3" (a registered trademark of Australian Titan Products Pty. Ltd. for a titanium dioxide pigment), 0.1 part of "Nopco NXZ" (a registered trademark of Nopco Chemical Company for an antifoaming agent), 0.3 part of a 25% (w./v.) solution of sodium hexametaphosphate, and the required amounts, given in Table 1, of water and thickener solution to give satisfactory viscosities both in the mill base and in the final paint. The particular thickener solution used in each of Examples 6–11 is given in Table 1. Each mill base was ground in a laboratory sand mill for thirty minutes, using about 5 parts of sand.

After reducing the stirring speed, 27 parts of a latex was added to each mill base. This proportion refers to the total amount added of latex as obtained from the manufacturer, together with any plasticiser added to the latex prior to the preparation of the paint. As can be seen from Table 1, the latex used in Examples 6–10 was "Primal AC61" (a registered trademark of Primal Chemicals Pty. Ltd. for an acrylic latex) plasticised with 5% (based on the latex solids) of tributylphosphate. The latex used in Example 11 was an acrylic latex "MV1" proprietary product of Rohm and Haas. Each paint was then stirred for a further ten minutes. In Examples 6 and 7, 0.1 part of "Fedwet 302" (a registered trademark of Federal Chemicals Pty. Ltd. for an anionic surfactant) was added during this stirring process.

EXAMPLE 12

This example illustrates the preparation of an aqueous latex paint incorporating an acrylic latex of small particle size and a polyvinyl alcohol thickener containing no acetal groups. This thickener lies outside of our invention, and the final paint has very poor flow characteristics.

The paint was prepared by the method used in Examples 6–11. The mill base comprised of 10 parts of "Austiox R–CR3," 0.1 part of "Nopco NXZ," 0.3 part of 25% w./v. sodium hexametaphosphate solution, and 0.5 part of "Gelvatol 1–90" in 7.2 parts of distilled water. Twenty-seven parts of "Primal AC61," plasticised with 5% (based on the latex solids) of tributyl phosphate, were added to complete the paint.

The gloss of a film of this paint drawn on glass with a doctor blade was 75 at an angle of 60°. The plastic viscosity was 51 centipoises. The flow coefficient was 0.3, while the New York Paint Club Flow Rating was 0, indicating very poor flow characteristics. When the paint was brushed out on primed wood, brush marks were very noticeable.

EXAMPLE 13

This example illustrates the preparation of a conventional aqueous latex paint incorporating an acrylic latex of small particle size and a cellulosic thickener. The latex paint had good gloss, but very poor flow characteristics, and is outside of our invention.

The paint was prepared by the method used in Examples 0–12. The mill base comprised of 10 parts of "Austiox R–CR3," 0.1 part of "Nopco NXZ," 0.3 part of 25% w./v. sodium hexametaphosphate solution, 0.12 part of "Natrosol 250HR" (a registered trademark of Hercules Powder Company for a hydroxyethyl cellulose), and 4.5 parts of distilled water. Twenty-eight parts of "Primal AC61" and 0.7 part of tributyl phosphate were added to complete the paint.

The gloss of a film of this paint drawn on glass with a doctor blade was 75 at an angle of 60°. The plastic viscosity was 200 centipoises. The flow coefficient was 1.2 while the New York Paint Club Flow Rating was 0, indicating very poor flow characteristics. As expected, brush marks were evident to an objectional degree in a film brushed out on primed wood.

EXAMPLES 14–16

These examples illustrate the preparation of a series of partial benzaldehyde acetals of poly (vinyl alcohol) with differing degrees of hydroxyl group substitution. These are prepared by reaction of poly (vinyl alcohol), molecular weight approximately 115,000, with benzaldehyde, and a phosphoric acid catalyst. Successive amounts of benzaldehyde are removed by distillation, with samples of the polymer solution being removed and neutralised at each stage.

Ten parts of "Gelvatol 1–90" were dissolved in 75.7 parts of water. Additions of 37.2 parts of propylene glycol, 3.8 parts of benzaldehyde and 1.26 parts of phosphoric acid (of specific gravity 1.85) were made. The mixture was refluxed for three hours after which 4.4 parts were distilled from the bulk of the mixture over a period of 30 minutes. From the remaining portion of the solution, 20 parts were removed and neutralised with ammonia (of specific gravity 0.88). The neutralised portion was poured into 200 parts of acetone and the precipitated polymer, after removal of excess liquid, was dissolved in a mixture at equal parts of water and ethanol yielding a solution containing 4.7% solids. This solution will be referred to as thickener F.

Another thickener was prepared from the remaining original acidified polymer solution by distilling 5.4 parts from the bulk of the solution, then removing and neutralising 20 parts of the remaining solution. The neutralised portion was poured into an excess of acetone, and the precipitate formed, after removal of excess liquid, was dissolved in water to yield a solution of solids 3.6% which will be referred to as thickener G.

Yet another thickener was prepared from the remaining acidified polymer solution, by distilling a further 6 parts from the bulk of the solution. All of the remaining solution was neutralised and the polymer was precipitated in acetone and then dissolved in water yielding a solution of solids 5.7% which will be referred to as thickener H.

The degrees of hydroxyl group substitution in the polymers in thickeners F, G and H were determined by hydrolysis in 2% phosphoric acid and simultaneous distillation of the liberated aldehyde into solutions containing hydroxylamine hydrochloride. Subsequent titration of these solutions with standard potassium hydroxide solution, using a pH meter, led to calculated values of about 6, 4 and 1.9% for the percentages of hydroxyls in the polyvinyl alcohols substituted by acetal groups in thickeners F, G and H respectively. It should be noted that thickener H lies outside the range of compositions of this invention.

EXAMPLES 17–19

A similar series of thickeners to those in Examples 14–16 were prepared using polyvinyl alcohol at molecular weight approximately 20,000.

Ten parts of "Gelvatol 1–30" were dissolved in 75.7 parts of water. Additions of 37.2 parts or propylene glycol, 3.8 parts of benzaldehyde and 1.26 parts on phosphoric acid (of specific gravity 1.85) were made. Successive amounts of 1.7, 10 and 3 parts were distilled from the solution, with 30 parts of the solution being removed from the bulk of the acidic polymer solution after each distillation. Each of these portions was neutralised with ammonia (of specific gravity 0.88), and the polymer precipitated by addition to 300 parts of acetone. After removal of excess liquid the polymers were dissolved in water (or equal parts of water and ethanol for the first fraction) to yield solutions which will be referred to as thickeners I, J and K.

The solids content of these thickeners were 5.7, 6.4 and 7.8 respectively. Analysis by the method outlined in Examples 14–16 gave approximate values for the percentages of hydroxyl groups replaced by acetal groups of 6.5, 3 and 2 respectively.

EXAMPLES 20–25

These examples illustrate the preparation of aqueous latex paints incorporating thickeners F–K from Examples 14–19. These paints show the effect on flow of differeing degrees of substitution of hydroxyl groups by acetal groups in the thickener molecules and also show the importance of pH control especially when using thickener polymers with percentages of hydroxyl group replacement close to the lower limit as outlined in this specification. Paints with excellent flow and gloss are obtained when using thickeners F, G, I, J and K. In Example 22, using thickener H, which lies outside the range of this patent, good flow is not obtained.

The composition of each of the latex paints in these examples is summarised in Table 2. In each case the paint was prepared by first mixing a mill base consisting of 10 parts of "Austiox R–CR3," 0.1 part of "Nopco NXZ," 0.3 part of a 25% w./v. solution of sodium hexametaphosphate, and the amount of thickener shown in Table 2. In Examples 23 and 25 a small amount of the latex was required to obtain a mill base of suitable viscosity. Each mill base was placed in a jar with 10 parts of glass beads (¼" diameter) and ground for 2 hours on a laboratory shaker. After this time, 27 parts of latex, "Primal AC61" plasticised with 5% (based on the latex solids) of tributyl phosphate, were added with stirring to each mill base.

The paints, as prepared, had a pH of about 9. A portion of each of paints in Examples 21, 22, 24 and 25 was adjusted to a pH of 8 using dilute phosphoric acid.

The rheology of each of the paints in Examples 20–25, at pH 8 and pH 9, was measured at 25° C. on the Epprecht Rheomat "15," using the "B" cup. The plastic viscosities and flow coefficients as defined in our invention were determined and are recorded in Table 2. The flow coefficients in Examples 20, 23, 24 at pH 9 are all greater than 4.5 indicating that the paints have excellent flow characteristics. The paints in Examples 21 and 25 incorporate thickeners G and K which have hydroxyl group replacements near the lower limit given in the specification, and these paints have flow coefficients at less than 3, indicating poor flow. However, when the pH of Examples 21 and 25 is reduced to 8, the flow coefficients become greater than 4.5 indicating excellent flow. The paint given in Example 22 incorporates a thickener of acetal content outside the range of this invention. Good flow is not obtained in this paint even after lowering the pH to 8.

The flow characteristics of each of the paints is also reflected in the New York Paint Club Flow Ratings, which for the paints with flow coefficients greater than 4.5, are greater than 3.

Films of each of the paints made in Examples 20–25 were prepared on glass panels using a doctor blade of clearance 0.008". The gloss values measured at an angle of 60° according to A.S.T.M. Specification D523 are given in Table 2. All of these gloss values indicate excellent gloss for latex paints.

These results show that paints given in Examples 20, 21, 23, 24 and 25 will form films of good gloss and with remarkable freedom from brush marks. In contrast, the paint given in Example 22, which lies outside the range of this patent, will show brush marks to a much greater degree.

TABLE 2

| | Example | | | | | |
|---|---|---|---|---|---|---|
| | 20 | 21 | 22 | 23 | 24 | 25 |
| | Thickener solution used (from Examples 12-19) | | | | | |
| | F | G | H | I | J | K |
| | Latex used | | | | | |
| | Primal AC61, Plasticised* | Primal AC61, Plasticised* | Primal AC61, Plasticised* | Primal AC61, Plasticised* | Primal AC61, Plasticised* | Primal AC61, Plasticised* |
| Composition: | | | | | | |
| Austiox R-CR3 | 10 | 10 | 10 | 10 | 10 | 10 |
| Nopco NXZ | 0.1 | 0.1 | 0.1 | 0.1 | 0.1 | 0.1 |
| 25% sodium hexametaphosphate solution | 0.3 | 0.3 | 0.3 | 0.3 | 0.3 | 0.3 |
| Thickener solution | 8.4 | 11.0 | 7.0 | 14.0 | 12.4 | 10.0 |
| Latex | 27 | 27 | 27 | 27 | 27 | 2.7 |
| Properties: | | | | | | |
| pH | 9 | 9    8 | 9    8 | 9 | 9 | 9    8 |
| Gloss at 60° | 73 | ----    76 | ----    ---- | 70 | 75 | ----    76 |
| Plastic viscosity (centipoise, 25° C) | 200 | 35    80 | 25    50 | 50 | 40 | 20    30 |
| Flow coefficient | 9.0 | 1.2    30 | 0.4    0.4 | 250 | 200 | 0.7    9 |
| N.Y.P.C. flow rating | 4 | ----    9 | ----    0 | 9 | 8 | ----    7 |

*Primal AC61, 97.5 parts; tributyl phosphate, 2.5 parts.

EXAMPLE 26

This example illustrates a further preparation of a thickener by the method of the invention. A partial benzaldehyde acetal of poly (vinyl alcohol) is prepared.

Ten parts of "Poval 124" (a registered trademark of Kurashiki Rayon Company Ltd.) was dissolved in 79 parts of water. To this was added 37.2 parts of propylene glycol, 2.94 parts of benzaldehyde and 1.26 parts of phosphoric acid (of specific gravity 1.85). The mixture was refluxed for two hours, after which 6.0 parts were distilled from the bulk of the solution over a period of 35 minutes. The remaining solution was neutralised with ammonia (of specific gravity 0.88) and a further 7.9 parts were then distilled leaving a solution containing 10.8% solids which will be referred to as thickener L.

When a portion of thickener L was diluted with distilled water in the ratio of 1:25, and heated, it became cloudy at about 40° C. This cloud temperature has been found to be a useful control in the manufacture of the thickeners.

EXAMPLES 27-29

The examples illustrate the preparation of aqueous latex paints by the method of the invention. Thickener L from Example 26 is used to prepare latex paints with good gloss and exceptional flow using three different latexes.

The composition of each of the latex paints in these examples is summarised in Table 3. In each case the paint was prepared by grinding in a pebble mill a mill base consisting of 10 parts of "Austiox R-CR3," 0.1 part of "Nopco NXZ," 0.3 part of a 25% w./v. solution of sodium hexametaphosphate, and 2.7 parts of distilled water. After grinding for 16 hours, 27 parts of a latex and 5 parts of thickener L from Example 26 were added with stirring. As can be seen from Table 3 the latex used in Example 27 was "Lytron 680" (a registered trademark of Monsanto Chemical Company), while the latex used in Example 28 was "Dow Latex 881" (a registered trademark of The Dow Chemical Company), and the latex used in Example 29 was "Revacryl 211" (a registered trademark of Revertex Limited).

The paints were adjusted to a pH at about 7.5 with dilute phosphoric acid.

The rheology of each of the paints given as Examples 27-29 were measured at 25° C. on an Epprecht Rheomat "15" using the "B" cup. The plastic viscosities and flow coefficients, as defined in our invention were determined and are recorded in Table 3. The flow coefficients are above 4.5 for Examples 28 and 29 indicating that both of these paints have excellent flow characteristics. While the flow coefficient of the paint given as Example 27 is less than 4.5 it still had remarkably good flow when applied by a brush, with the brush marks flowing out to a degree uncommon in latex paints. The excellent flow of the three paints was confirmed by the New York Paint Club Flow Ratings, also recorded in Table 3, all of which are greater than 3.

Films of each of the paints made as Examples 27-29 were prepared on glass panels using a doctor blade of clearance 0.008". The gloss values at 60° were measured according to A.S.T.M. Specification D523, and are given in Table 3. These values are considered good for latex paints.

These results show that paints with excellent flow and good gloss can be prepared irrespective of the latex polymer type, so long as the particle size is satisfactory, and so long as undesirable components, described above as those leading to mutual incompatibility of the ingredients, are absent.

TABLE 3

| | Example | | |
|---|---|---|---|
| | 27 | 28 | 29 |
| | Thickener solution used (from Example 26) | | |
| | L | L | L |
| | Latex used | | |
| | Lytron 680 | Dow 881 | Revacryl 211 |
| Composition: | | | |
| Austiox R-CR3 | 10 | 10 | 10 |
| Nopco NXZ | 0.1 | 0.1 | 0.1 |
| 25% sodium hexametaphosphate solution | 0.3 | 0.3 | 0.3 |
| Water | 2.7 | 2.7 | 2.7 |
| Latex | 27 | 27 | 27 |
| Thickener solution | 5 | 5 | 5 |
| Properties: | | | |
| pH | 7.5 | 7.5 | 7.5 |
| Gloss at 60° | 85 | 65 | 72 |
| Plastic viscosity (centipoise, 25° C.) | 90 | 200 | 180 |
| Flow coefficient | 4.1 | 6.5 | 7.4 |
| N.Y.P.C. flow rating | 5 | 4 | 4 |

EXAMPLE 30

This example illustrates the preparation of a thickener by the method of the invention. A partial heptaldehyde acetal of poly (vinyl alcohol) was prepared by reacting poly (vinyl alcohol) with excess heptaldehyde, and removing this excess by means of a distillation process.

Ten parts of "Moviol N70-98" (a registered trademark of Farbwerke Hoechst A.G.) was dissolved in 60 parts of distilled water. To this were added 150 parts of dioxane, 2.1 parts of heptaldehyde and 1.2 parts of concentrated hydrochloric acid (35% w./v.). After the mixture had been refluxed for 6 hours, 240 parts were removed from the bulk of the solution by distillation, and, simultaneously, a mixture at 90 parts of dioxane and 90 parts of water were added to the solution to maintain the volume at a reasonable level. The polymer solution was then neutralised with triethylamine. The polymer was precipitated by adding this neutralised solution to 2,000 parts of acetone, and, after removing the excess liquid, the polymer was dissolved in water to give a solution containing approximately 10% solids. This solution will be referred to as thickener M.

EXAMPLE 31

This example illustrates the preparation of an aqueous gloss latex paint by the method of the invention. The latex paint incorporates thickener M from Example 30, and when prepared it shows excellent flow characteristics and gloss on application.

A mill base was prepared by the method given in Examples 27–29. To this were added 27 parts of Primal AC61 plasticised with 5% (base on the latex solids) of tributylphosphate, 5 parts of thickener M given as Example 30 and 5 parts of water. The paint was stirred thoroughly. The rheology of the paint was measured at 25° C. on an Epprecht Rheomat "15" using the "B" cup. The plastic viscosity as defined in our invention was 2.4 poises, while the flow coefficient, also defined in our invention, was 4.8 indicating excellent flow. This was confirmed by the New York Paint Club Flow Rating of 4.

A film of the paint was prepared on a glass panel using a doctor blade at clearance 0.008". The gloss value measured at 60° according to A.S.T.M. Specification D523 was 72. This is very good for a latex paint.

These results shown that the paint given as Example 31 will form a film of good gloss and with remarkable freedom from brush marks.

EXAMPLE 32

A partial benzaldehyde acetal of poly (vinyl alcohol) was prepared by the method given in Example 26 except that "Poval 124" was replaced by "Gelvatol 1–90." A viscous solution was obtained, containing 9.8% solids, and this will be referred to as thickener N.

EXAMPLE 33

This example illustrates the preparation of a latex paint with deliberately degraded flow properties to give controlled application characteristics, according to this invention. Poly (vinyl alcohol), with no acetal substitution of the hydroxyl groups, is used together with a partial benzaldehyde acetal of poly (vinyl alcohol) to give a paint with ease of brushing and with outstanding resistance to sagging when applied to a vertical surface.

One part of a paint, having excellent flow, prepared as Example 20, which contains a partial benzaldehyde acetal of poly (vinyl alcohol), was thoroughly mixed with one part of a paint, having poor flow prepared as Example 12, which contains poly (vinyl alcohol) with no acetal substitution of the hydroxyl groups.

The paint obtained in this manner had a high shear viscosity of 1.5 poise, and a flow coefficient of 2.1. The New York Paint Club Flow Rating was 1. When applied by brush to a vertical surface, brush marks were evident. However, the paint had excellent resistance to sagging, and the ease of brushing was noted.

The gloss of a film of the paint drawn on glass remained high, with a value of 72 at an angle of 60°.

We claim:
1. A coating composition comprising:
a polymer latex vehicle containing between 5% and 60% by weight calculated on the latex vehicle of dispersed resinous particles having an average particle size between 0.01 micron and 3.0 micron, the resinous particles comprising polymerized monomer at least 97% by weight of which is selected from at least one member of the group consisting of esters of acrylic and methacrylic acids in which the ester group contains from 1 to 10 carbon atoms and styrene
and 0.1% to 10% based on the weight of the disperse resinous particles of a thickening agent having an average molecular weight between 10,000 and 600,000 which is a poly(vinyl alcohol) derivative wherein hydroxyl groups are substituted in pairs by acetal groups of the formula:

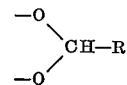

where R, which may vary within the polymer molecule, contains 4 to 8 carbon atoms and may be alkyl, alkenyl, aryl, alk-aryl, aralkyl or aralkene, the degree of substitution of the hydroxyl groups of the poly(vinyl alcohol) derivative, expressed as a percentage of the total hydroxyl groups, is determined according to the following table:

| Average carbon atoms in R: | Percent substitution |
|---|---|
| 4 | 3.5–17 |
| 5 | 2.5–15 |
| 6 | 2–15 |
| 7 | 1.5–10 |
| 8 | 1.5–10 |

2. A coating composition according to claim 1, wherein R is phenyl.

3. A coating composition according to claim 1, wherein the degree of substitution is determined according to the following table:

| Average carbon atoms in R: | Percent substitution |
|---|---|
| 4 | 10–17 |
| 5 | 5–15 |
| 6 | 5–15 |
| 7 | 5–10 |
| 8 | 5–10 |

4. A coating composition according to claim 3, wherein the degree of substitution is determined according to the following table:

| Average carbon atoms in R: | Percent substitution |
|---|---|
| 5 | 5–10 |
| 6 | 5–10 |

5. A coating composition according to claim 1, wherein the thickener is present in an amount between 0.5% and 5.0% by weight of the resinous particles of the latex.

References Cited

UNITED STATES PATENTS 2,279,436  4/1942  Berg.
3,079,356  2/1963  Oda et al. _____ 260—29.6

FOREIGN PATENTS 610,942  12/1960  Canada.
475,162  11/1937  Great Britain.

MURRAY TILLMAN, Primary Examiner

W. J. BRIGGS, Sr., Assistant Examiner

U.S. Cl. X.R.

260—41, 91.3, 874, 901